(12) United States Patent
Ke et al.

(10) Patent No.: US 7,773,612 B2
(45) Date of Patent: Aug. 10, 2010

(54) NETWORKING CONTROLLER, DEVICE AND COMMUNICATION NETWORK SYSTEM OF ASYNCHRONOUS TRANSFER MODE

(75) Inventors: Shanfeng Ke, Shenzhen (CN); Zhongyang Yu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 873 days.

(21) Appl. No.: 11/513,766

(22) Filed: Aug. 31, 2006

(65) Prior Publication Data
US 2007/0053298 A1 Mar. 8, 2007

Related U.S. Application Data

(63) Continuation of application No. PCT/CN2005/000276, filed on Mar. 7, 2005.

(30) Foreign Application Priority Data
Mar. 8, 2004 (CN) .................... 2004 1 0028524

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl. .................... 370/401; 370/236; 370/395; 370/452

(58) Field of Classification Search ......... 370/230–237, 370/241–395, 401–466; 709/229–241
See application file for complete search history.

(56) References Cited

U.S. PATENT DOCUMENTS 5,548,587 A * 8/1996 Bailey et al. ............. 370/395.7

(Continued)

FOREIGN PATENT DOCUMENTS

CN 1121283 A 4/1996

(Continued)

OTHER PUBLICATIONS

State Intellectual Property Office of the People'S Republic of China, Written Opinion of the International Searching Authority in International Patent Application No. PCT/CN2005/000276 (Jun. 9, 2005).

(Continued)

*Primary Examiner*—Man Phan
(74) *Attorney, Agent, or Firm*—Leydig, Voit & Mayer, Ltd.

(57) ABSTRACT

The present invention discloses an ATM networking controller, including: an external interfaces and an internal interface; an Interface Processing Module for processing network transmission services and implementing the uplink/downlink transmission of local services and the transparent transmission of non-local services; an OAM Processing Module for implementing automatic topology management and data configuration synchronization through OAM information elements; a Switching and Scheduling Processing Module for scheduling the interconnection services and guaranteeing the QoS thereof; and a Routing or Protection Switching Module for switching a path, implementing self-healing recovery of services, detecting failures, and conducting the corresponding switching protection. An ATM device and an ATM communication network system are disclosed by the present invention as well. According to this invention, various networking modes can be implemented flexibly, maintenance of the network is more convenient, and the efficiency and reliability of the network is guaranteed.

3 Claims, 3 Drawing Sheets

U.S. PATENT DOCUMENTS

| | | |
|---|---|---|
| 5,600,652 A | 2/1997 | Kreamer et al. |
| 6,084,880 A * | 7/2000 | Bailey et al. ............. 370/395.2 |
| 6,442,167 B1 * | 8/2002 | Aramaki et al. ........ 370/395.43 |
| 6,545,978 B1 * | 4/2003 | Sakurai ................... 370/236.2 |
| 6,574,224 B1 | 6/2003 | Brueckheimer et al. |
| 6,614,759 B1 * | 9/2003 | Lee et al. ................. 370/236.2 |
| 6,639,893 B1 * | 10/2003 | Chikenji et al. ............. 370/217 |
| 6,728,205 B1 * | 4/2004 | Finn et al. ................... 370/217 |
| 6,744,726 B1 * | 6/2004 | Minami ....................... 370/217 |
| 6,865,158 B2 * | 3/2005 | Iwamoto ..................... 370/248 |
| 6,868,066 B1 * | 3/2005 | Fujita ...................... 370/236.2 |
| 6,885,676 B2 * | 4/2005 | Ebina et al. ................. 370/452 |
| 7,197,008 B1 * | 3/2007 | Shabtay et al. ............. 370/218 |

FOREIGN PATENT DOCUMENTS

| | | |
|---|---|---|
| CN | 1211125 A | 3/1999 |
| JP | 2002-217946 | 8/2002 |
| WO | 03/075499 A1 | 9/2003 |

OTHER PUBLICATIONS

Lu et al., "ATM QoS Management Based on OAM Performance Monitoring," China Academic Journal Electronic Publishing House, vol. 23, No. 7, pp. 792-796 (Jul. 2002).

* cited by examiner

NETWORKING CONTROLLER, DEVICE AND COMMUNICATION NETWORK SYSTEM OF ASYNCHRONOUS TRANSFER MODE

This application is a continuation of International Patent Application No. PCT/CN2005/000276, filed Mar. 7, 2005, which claims priority to Chinese Patent Application No. 200410028524.8, filed Mar. 8, 2004, all of which are hereby incorporated by reference.

FIELD OF THE INVENTION

The present invention relates to Asynchronous Transfer Mode (ATM) networking technology, and particularly to a networking controller of ATM and an ATM device as well as a communication network system based on the networking controller.

BACKGROUND OF THE INVENTION

The ATM is a standard transfer mode constituted by ITU-T (International Telecommunication Union—Telecommunication Standardization Sector), in which information is organized into information elements. Since each information element including the information from a certain user does not need to occur periodically, this transfer mode is asynchronous. ITU-T named this technology ATM technology in 1988 and recommended it as the information transfer mode of B-ISDN (Broad Integrate Service Digital Net). Because the ATM technology simplifies the switching process, eliminates unnecessary data checks, and adopts a fixed format of information element which is easy to be processed, the switching velocity of ATM is greatly higher than that of a conventional data network, such as X2.5, DDN (Digital Data Network) and frame relay networks.

The transmission links of ATM are divided into two levels: Virtual Path (VP) level and Virtual Channel (VC) level. In addition, for the data network with such a high speed, some effective supervisory mechanisms for service streams are adopted in ATM networks to make real-time supervision on online user data, so that the probability of network congestion is minimized. Different privileges are granted to different services. For example, the voice service has the highest real-time privilege while common data file transmission has the highest correctness privilege. The network assigns different network resources to different services according to different QoS (Quality of Service), so that different services can coexist in harmony and run efficiently. The service types of ATM includes: Constant Bit Rate (CBR), real-time Variable Bit Rate (rt-VBR), non-real-time Variable Bit Rate (nrt-VBR), Unspecified Bit Rate (UBR) and Available Bit Rate (ABR).

ATM broadband networks, constituted on the base of ATM switches, can provide narrowband and broadband information with an integrated and uniform transfer platform, which can satisfy the transmission of integrated services, and guarantee the QoS effectively. In other words, ATM is applicable not only to the burst services such as data information transmission, but also to the services of a higher real-time requirement, such as transmission of voice, video image and so on. In terms of adaptability of data transmission, an ATM network can be adapted for a low-velocity transmission, a high-velocity transmission, and a variable-velocity transmission. Therefore, ATM has a broad prospect of application and is worth active exploration and development.

Generally speaking, an ATM network consists of an access layer and a core layer. The access layer includes local ATM devices or sub-networks, and the core layer is a switching network. According to the need of network applications, the ATM devices can be configured into network topologies such as a chain, a tree, a star, a ring, and a reticulation. Different networking modes require different structures, as well as hardware, software and maintenance of ATM devices. Due to the particularity of the ATM technology, for example, the particularity of being based on virtual connections, the particularity of fixed-length packets switching and so on, ATM devices can bear different services including broadband services and narrowband services. However, if an ATM device is required to support all networking modes, it will be very complicated and expensive. In particular, if the network architecture needs to be modified after the networking mode of ATM devices is determined, there will be such problems as difficulty in software and hardware upgrading or modification, heavy burden of modifications on configuration data, long time interruption of services. Therefore, in ATM networks of the prior art, one type of ATM device usually supports only one or a few specific networking modes.

Figure 1A:
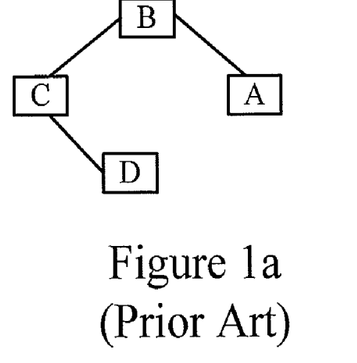
FIG. 1a to FIG. 1e are schematic diagram illustrating the network topology of a chain, a tree, a star, a ring and a reticulation, respectively.

FIG. 1a to FIG. 1e are the schematics illustrating different network topology of a chain, a tree, a star, a ring and a reticulation, respectively, constituted by a plurality of ATM devices. Each node is an ATM device. For the chain networking, as shown in FIG. 1a, an end node provides one interface and an intermediate node provides two interfaces; nodes are connected pairwise by interfaces to constitute a chain network; the switch of an intermediate node switches the services passing this node from other nodes in addition to switching the services of this node.

Figure 1B:
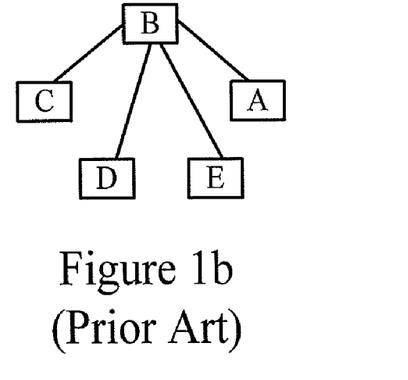

For the star network, as shown in FIG. 1b, there is only one assembly node in the network, and except the assembly node, each of other nodes has only one interface respectively which is connected to one of the interfaces of the assembly node. All the service connections in the network need to be switched in the assembly node.

Figure 1C:
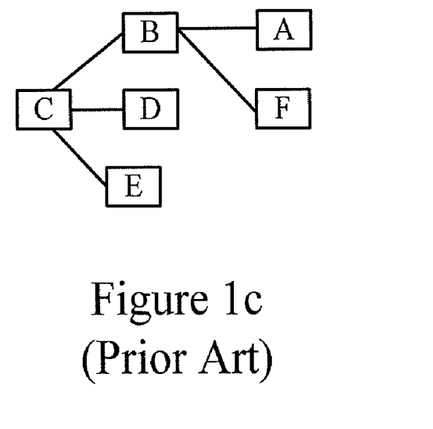

For the tree network, as shown in FIG. 1c, there are multiple assembly nodes in the network, and assembly nodes connect with each other by interfaces; all the service connections in the network need to be switched via one or multiple assembly nodes.

Figure 1D:
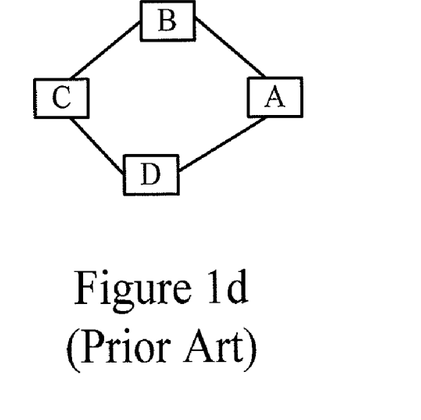

For the ring network, as shown in FIG. 1d, all the nodes in the network are connected in series, and the beginning node is connected with the ending node; the connection of any two nodes includes two paths which can backup each other. This network topology is of high survivability.

Figure 1E:
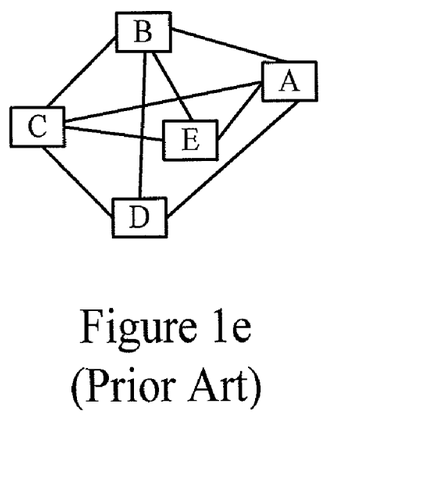

For the reticular network, as shown in FIG. 1e, there are multiple pairs of nodes which are connected with each other, and it is called an ideal reticular topology if all the nodes are directly connected with each other. The reticular architecture is not influenced by the problems of node bottleneck and invalidation, and there are multiple routes between two nodes so that it is highly reliable.

To meet the requirement of applications of the networking modes, complicated software and hardware have been designed so that various types of hardware interface and software interface are furnished in the network devices; the hardware interface and software interface are selected according to the type of networking in use. If the networking mode is changed, the software and the hardware need to be replaced or upgraded; alternatively, the networking is implemented directly via the interconnection of interfaces, i.e. by means of ATM switching network plus interfaces. ATM service devices for switching use are interconnected via the self-furnished interfaces; the network interfaces, i.e. the networking interfaces, and local user interfaces are managed uniformly.

In practical applications, however, according to the above networking solution, the devices cost a great deal, and are complicated in terms of design and maintenance, as well as in configuration with each other. The network architecture is difficult to change. In addition, large numbers of ports of the switching network have to be occupied, and services from other nodes by way of this node occupy the switching network resources of this node, which greatly confines the interconnecting service between networks while sacrificing the switching capacity of local services of each node. Moreover, complicated configuration makes it easy to produce errors in butting and it is impossible to change the network architecture online. Under certain networking circumstances, such as ring networking, it is difficult to implement dynamic protection switching of ring network services.

The major reason is that an ATM network device has integrated all the function modules, binding functions associated with networking interface with functions of local switching so that services of the switching network and local services can not be processed separately while changes in networking have an impact on the functions of the entire device, resulting in an increasing complexity in implementation and maintenance and compromising the efficiency and reliability of the system.

SUMMARY OF THE INVENTION

The embodiments of the present invention provide an Asynchronous Transfer Mode (ATM) networking controller, comprising:

an external interface and an internal interface;

an Interface Processing Module, which is used for processing network transmission services, and for implementing Uplink/Downlink transmission of local services and transparent transmission of non-local services;

an Operation and Maintenance (OAM) Processing Module, which is used for implementing an automatic topology management and a data configuration synchronization through OAM information elements;

a Switching and Scheduling Processing Module, which is used for scheduling interconnection services, and guaranteeing the Quality of Service thereof, and a Routing or Protection Switching Module, which is used for switching paths, implementing self-healing recovery of services, detecting failures in an ATM layer and a transfer layer, and performing the switching protection when a failure is detected.

The embodiments of the present invention provide an ATM communication network system, comprising interconnected ATM devices, wherein each ATM device comprises a Local ATM Switching Network Module and a networking controller connected to the ATM switching network module through an internal interface of the networking controller;

the networking controller of each ATM device is interconnected to the networking controller in an adjacent ATM device through an external interface of the networking controller;

the networking controller is used for implementing network interconnection and network management in the ATM devices, and for performing the service interaction with the Local ATM Switching Network Module;

the Local ATM Switching Network Module is used for implementing the function of service switching in ATM switching devices.

The embodiment of the present invention provide an ATM device, comprising:

a Local ATM Switching Networking Module, used for implementing the function of service switching in the ATM switching device;

a networking controller, which is connected to the local ATM switching networking module through an internal interface of the networking controller, used for implementing network interconnection and network management in the ATM device, and for performing the service interaction with the Local ATM Switching Network Module.

The solution according to the embodiments of the invention brings effects as follows:

1) Supporting multiple networking modes flexibly at lower cost, and increasing the networking flexibility and the convenience of network maintenance by adding a networking controller to the devices;

2) Realizing protection switching of the ATM network, and guaranteeing the reliability of the network by supporting a plenty of failure detecting functions and protection switching protocols;

3) Making the network based on the networking controller able to bear all kinds of services and satisfying the QoS of all kinds of service bearers by supporting clock protections, multicast services and ATM scheduling functions;

4) supporting the entire network topology and uniform configuration of the entire network by extending OAM information element communication by means of the OAM Processing Module, decreasing the complexity of network maintenance, and greatly lowering the investment of operators in network maintenance;

5) Realizing the flexible online adjustment of the network architectures without upgrading or modifying the software or hardware by the cooperation of the processing modules.

DETAILED DESCRIPTION OF EMBODIMENTS

To make the technical solution and merit of the present invention more clear, the present invention is hereinafter further described in detail with reference to the accompanying drawings and specific embodiments.

The basic idea of the present invention is: adding in the ATM devices a networking controller, which realizes the switching and scheduling, failure detecting, protection switching, as well as maintenance and administration of interconnecting service within the network; and referring to the portion of the ATM devices specially for the service switching function as the ATM Switching Network Module thus separating the network interconnection function and network management function in ATM devices from the conventional switching function. Here, the networking controller and the ATM Switching Network Module are interconnected by internal interface to constitute an integrated ATM device realizing the same functions of the prior art ATM devices with a different physical and logical configuration.

Figure 2:
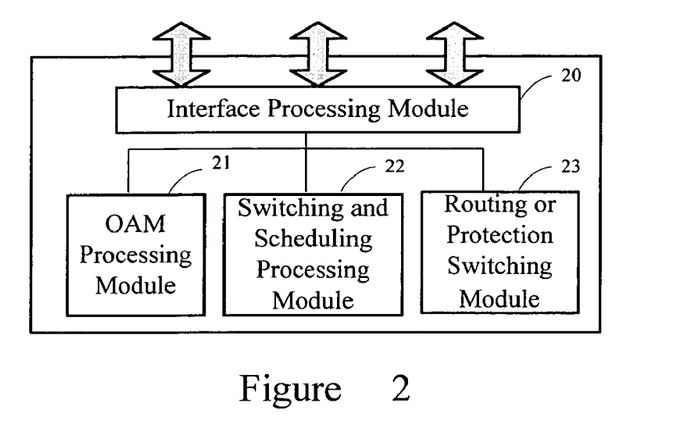
FIG. 2 is a schematic diagram illustrating the constitution of modules in accordance with a preferred embodiment of the networking controller of the present invention.

FIG. 2 is a schematic illustrating the configuration and interconnection of the function modules of the networking controller in accordance with a preferred embodiment of the present invention. This networking controller is embedded in the interface panel or the controlling panel of the ATM device. The networking controller uses the CPU on the interface panel or the controlling panel of the ATM device instead of having a CPU itself, and handles various events of networking controller by sending interruption requests for the resources of CPU on the interface panel or controlling panel. In this way, the functions of the software part of a networking controller are realized. The networking controller logically comprises four processing modules: an Interface Processing Module 20, an Operation and Maintenance (OAM) Processing Module 21, a Switching and Scheduling Processing Module 22, and a Routing or Protection Switching Controlling Module 23. The Interface Processing Module 20 is used for managing the sending and receiving operations on every layer of each interface and exchange of data therebetween; the OAM Processing Module 21 is used for detecting and inserting alarm, maintaining ATM VP links, and bearing and transmitting the controlling information between the controllers; the Switching and Scheduling Processing Module 22 is used for handling the scheduling and the QoS guarantee of various interconnecting services in the network; the Routing or Protection Switching Controlling Module 23 is used for processing the automatic switching of service route or the protection switching of service connection when the network topology is changed.

The hardware of the networking controller consists of two parts: an ATM Interface and a Networking Controlling Chip, wherein the ATM Interface is a universal interface in line with ATM Standards, which is used for realizing the communication of a certain networking controller with other networking controllers and the local ATM switching network; the Networking Controlling Chip is realized by the device such as specially designed Application Specified Integrated Circuits (ASIC) or a designed and programmed Field Programmable Gate Array (FPGA).

The software of the networking controller can be divided into four parts related to the four function modules, and the software is designed according to the required functions. The networking controller, when needing to realize a relevant function, sends a hardware interruption request for the resource of CPU in the Interface Panel of the local ATM device so that the CPU can run the corresponding part of the software and realize the function by software. In a preferred embodiment of the present invention, the software is stored on the storage medium of the networking controller, and the CPU runs this software by accessing the memory of the networking controller directly such that the networking controller is separated from the local ATM switching network completely.

The networking controller, by the combined use of hardware and software, can realize the functions as follows: OAM processing such as the acquisition and insertion of OAM information elements, scheduling based on VP level, multicast and replication, 1+1 switching or 1:1 protection or dynamic routing, and setting of primary/backup mode. These functions are optional, and can be set based on different networking modes.

In practical applications, the Interface Processing Module 20 is realized by software and hardware and is connected to other nodes directly. This module is specially for handling the service of network interconnecting interfaces so that the Local ATM Switching Network Module provides the only interface through which the local device is connected to other nodes in the network, whereas the changes in the network interface, the network architecture and the network capacity are not related to the local ATM device. Thus the special design of the ATM Switching Network Module for providing the network interface is simplified, the networking cost of ATM devices is lowered, and the networking flexibility of ATM devices is increased. The Interface Processing Module 20 is used for managing the sending and receiving operations on every level of each interface and the exchange of data between the interfaces, and for performing the functions of encoding/decoding in the physical layer, scrambling/descrambling, delineating and framing, wherein encoding/decoding in the physical layer refers to converting the analogue signal stream on the line into the bit stream so that it could be processed conveniently by the digital system; scrambling data in a predefined mode is to ensure the reliability of data transmission under interference, and descrambling data at the receiving end in a predefined mode is to extract useful data from the bit stream; delineating and framing is to get the data into packet and fill corresponding marking bytes or overheads to form standard frames according to the standard frame format such as the data frame format of ATM or the data frame format of Ethernet.

The OAM Processing Module 21 is realized by software and hardware and connected to the other three processing modules in the networking controller to cooperate with them. While networking, one node number, for example, a Media Access Control (MAC) address, is assigned to each networking controller. Networking controllers of different nodes communicate with each other by using extended OAM information element via the OAM Processing Module 21. Such extended OAM information elements include topology management discovery, controlling node selection, and network configuration, which can realize the topology management and service configuration of the entire network between networking controllers. By communications between OAM Processing Modules 21, any node in the network can maintain and manage the networking controllers of other nodes through exchange of OAM information elements. Here, the OAM information elements comprise two types: the Fault Maintaining information element and the Automatic Protection Switching (APS) information element, wherein, the Fault Maintaining information elements comprise four functional types: Alarm Indication Signal (AIS), Remote Defect Indication (RDI), Loopback Test (LB) and Continuous Check (CC); the APS information elements further comprise two types: Group Protection (GP) and Individual Protection (IP). The step in which the OAM Processing Module 21 processes OAM information elements comprises specifically: determining whether the information element is a local information element, if it is a local information element, conducting a routine process, otherwise transparently transmitting the information element to the next node.

In the OAM Processing Module 21, the communication method of extended OAM information elements comprises: on the basis of the communication method of OAM information element defined by ITU I.610 and ITU I.630, adding the OAM information elements internally generated by the networking controllers, such as the CC information elements transmitted on every VP per second; the AIS/RDI information elements inserted into the downstream node according to the alarms received from the physical layer; the information elements such as LB information elements, which is inserted by users. The method for capturing the OAM information elements is added as well, which comprises: when VP is the uploading/downloading node of a ring, the OAM information elements on this VP are terminated; and if the node is a transparent transmitting node, the OAM information elements are not processed but transparently transmitted directly.

ATM devices are interconnected through their own networking controllers. The OAM information elements are used for realizing the automatic topology management and the data configuration synchronization among the networking controllers. In this way, in the eyes of users, all networking controllers are equivalent to a virtual integer, and the services involving the entire network can be configured at any node. The data are synchronized automatically among the networking controllers of the entire network so as to simplify the maintaining process and to lower the maintenance cost.

The Switching and Scheduling Processing Module 22 is realized by software and hardware and connected to the other three processing modules in the networking controller to cooperate with them. The Switching and Scheduling Module 22 realizes the same switching and scheduling functions as that realized by the conventional ATM devices. The Switching and Scheduling Processing Module 22 are specially in charge of scheduling the interconnecting services between networks and guaranteeing the QoS so that the Local ATM Switching Network Module is used specially for switching local services, which reduces the requirement of capacity and technology for the local switching network, thereby reducing the cost of switching devices and increasing the shared bandwidth of the interconnecting services.

Switching and Scheduling Module 22 is in charge of handling the scheduling of various interconnecting services such as CBR, rt-VBR, nrt-VBR and UBR, the methods of which are described below: As there are both local up/down service flow and network transparent transmission service, flow in the networking controller while there are various service types, such as CBR\VBR/UBR/extra services, in both up/down services and transparent transmission services, the scheduling and cache management at VP level are supported in the networking controller to ensure the QoS of various services. Different service priority can be provided for different service connections according to the configuration so as to, for example, guarantee the bandwidth when the bandwidth needs to be guaranteed, or, distribute the extra burst services to different nodes fairly; at the same time, the functions such as congestion controlling and flow shaping are supported. In addition, for the multicast services, one multicast flow only occupies one share of bandwidth to reduce the occupation of the controlling bandwidth of the ring network, therefore in every networking controller, the multicast services need to be copied to local nodes. Because a networking controller is based on the VP level, the multicast suppression of the VC level needs to be realized in a multicast controller to prevent copying unnecessary VC level multicast flow to the local node within a multicast VP connection.

In addition, the Switching and Scheduling Module 22 can process broadband services and narrowband services, and guarantee the synchronization of the clock of the entire network very well. The Switching and Scheduling Module 22, by inquiring, setting and interruption reporting of the S1 byte in the section overhead of Synchronous Digital Hierarchy (SDH), realizes the switching of the source of synchronous clock when the quality of the clock or the quality of line declines, so as to improve the system capability of bearing multiple services.

The Routing or Protection Switching Module 23 is realized by software and hardware and is connected to the other three modules in the networking controller to cooperate with them.

The Routing or Protection Switching Module 23 has functions of a variety of network control protocols, such as the protocols for route management and service switching, and is specially used for path switching when the network topology changes so as to realize the self-healing recovery of services on the network. At the same time, the Routing or Protection Switching Module 23 monitors failures of the ATM layer and the transport layer, and make corresponding processing according to the 1+1 or 1:1 protection switching mechanism when detecting a failure in the links. In a preferred embodiment of the present invention, support for Virtual Path (VP) ring network is provided in particular, and there are the 1+1 and/or 1:1 protections based on VP channel; in this way, the mature technology is utilized effectively, and the network is made more reliable and stable.

An embodiment of processing a failure by the Routing or Protection Switching Module 23 is described below. If the network control protocol of the networking controller is set to the 1+1 mode, when the virtual connection is configured, the Routing or Protection Switching Module 23 sets the Peer to Peer (P2P) connection as the connection which is so-called transmitting two but selecting one to receive. In other words, the information elements are transmitted through two interfaces, but are received only through one normal interface thereof, and if the VP in one of the interfaces receives an alarm, the connection is switched to the other interface automatically so that the 1+1 protection of services can be realized. If the network control protocol of the networking controller is set to the dynamic routing mode, and the external system supports the dynamic routing, the Routing or Protection Switching Module 23 will set the networking controller to the mode of dynamically changing the switching direction of service virtual connection when there is a change of the route. The 1+1 protection mode is realized as follows: presuming that the fiber between two nodes breaks, the Interface Management Module 20 will detect the failure, and notify CPU to start the software of Interface Management Module 20 by an interruption; the software of Interface Management Module 20 will notify the networking controller system; the system will notify the next node that all the VP paths via this nodes have been interrupted; then the networking controller will invoke the software of the OAM Processing Module 21, and an AIS OAM alarm is inserted by the OAM Processing Module 21, which can be acquired by the OAM Processing Modules of other nodes; at the same time, the VP virtual connection, through which the local switch connects to the network, is checked, and if the working path is via the interface of the broken fiber, the networking controller will invoke the 1+1 protection protocol processing part of the software in the Routing or Protection Switching Module 23 to start protection switching; the software, by setting the appropriate Switching Control Register of the hardware, realizes the 1+1 path switching;

The Routing or Protection Switching Module 23 is especially in charge of the protection switching or routing of the interconnection services between networks, whereas the local ATM Switching Network Module does not need to support the protocol related to networking; thus, the overall design becomes simple and makes the maintenance easy. By technology sharing and modularized design, the networking controller lowers the cost of design and makes it easy to extend the functions.

It is hereinafter described how the Interface Processing Module 20 and the OAM Processing Module 21 cooperate to make the networking method flexible and reliable when the networking mode changes.

When the networking of an external network changes from one mode into another mode, e.g. from a star network into a ring network, then the external interfaces of the networking controllers, in terms of physical connection, are connected mutually to form a ring, whereas the internal interfaces are not changed. The working mode of the Interface Processing Module 20 will be modified into the ring working mode, and the networking controller previously located at an end node of the star network will further handle the transmission of network interconnection services, and the networking controller previously located at the tandem node of the star network will work with only two interfaces. At the same time, the OAM Processing Module 21 will transmit the OAM information elements to notify every node in the network, and the OAM information elements sent by any node can be received by all the other nodes; thus, the entire network configuration is implemented, and the network woks in the ring mode. In the entire process, the modification and upgrading of the software and hardware of networking controllers is not involved, and the configuration of the local ATM Switching Network Module is not affected. For local ATM devices, the modification of the networking mode is conducted transparently The method for the networking controller detecting and processing failures of the physical layer and ATM layer is implemented as follows. Failures of the physical layer, such as Signal Degrade (SD), Loss of Signal (LOS), Out of Frame (OOF), Loss of Frame (LOF), Alarm Indication Signal (AIS), Remote Defect Indication (RDI), and Loss of Pointer (LOP), are detected by the Interface Processing Module 20 and an alarm will be reported to the system after detection. The detection of AIS, RDI and CC of the VP connection in each interface of the ATM layer will be implemented by the OAM Processing Module 21, and the failures will be recorded and reported by the OAM information elements while the AIS and RDI information elements are inserted. Furthermore, the OAM Processing Module 21 implements the function of CC detection and activation/deactivation of AIS state and RDI state for all the VP connections between the interfaces, where the VP connection includes local Upstream/Downstream connections and network interconnections. OAM information elements will also extract the unknown information elements, acquire information elements in the ATM layer and report the elements to CPU, where the communications for reporting OAM information elements to CPU are conducted by the flow controlling method, i.e. conducted at a number of information element number per second.

Figure 3:
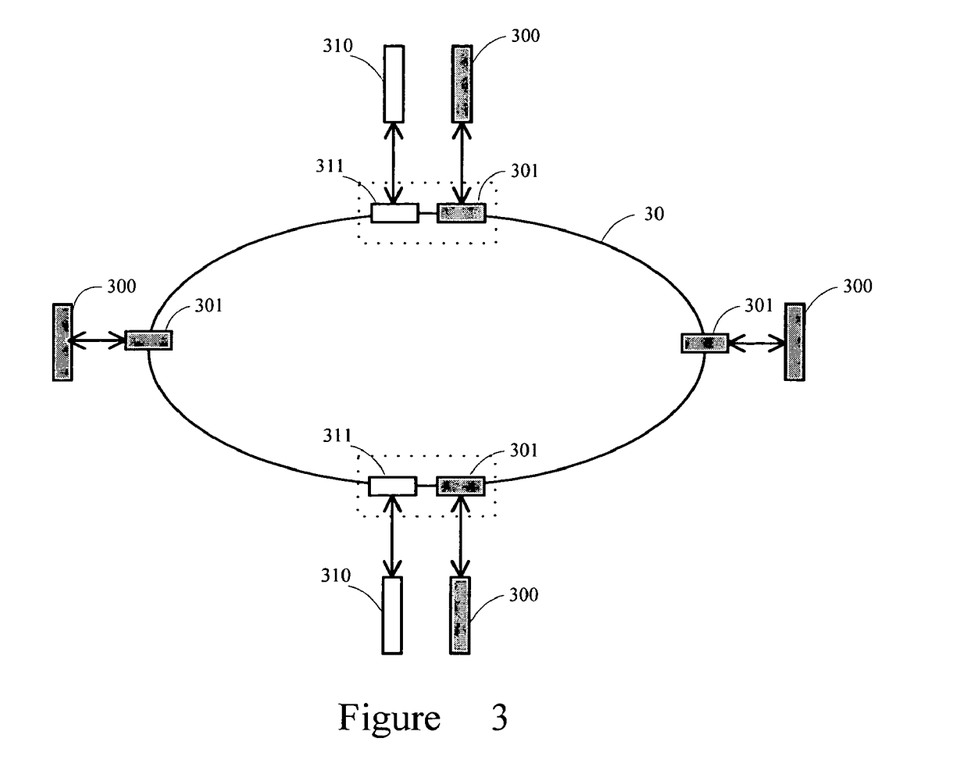
FIG. 3 is a schematic diagram illustrating a networking controller connected in an ATM ring network in accordance with an embodiment of the present invention.

An ATM device including the above described networking controller and ATM Switching Network Module is capable of constructing such network topology as chain, star, tree, ring or reticular according to the requirements. FIG. 3 illustrates a preferred embodiment of the networking controller being applied to a ring network according to the present invention. As shown in FIG. 3, label 301 and label 311 identify the networking controllers of a primary ATM device and the networking controllers of a backup ATM device, respectively, label 300 and label 310 identify the interface panels of the primary ATM device and the interface panels of the backup ATM device, respectively; and all the networking controllers are connected mutually by their own external interfaces to constitute a Fiber Ring Network 30. Each networking controller has two external interfaces, which are respectively connected to the two adjacent networking controllers in the ring network. With this architecture, the network level services can be implemented. The networking controllers are connected to the interface panel via the internal interfaces. The external interface herein may be various universal physical interfaces which conform to the definition of ITU-T, such as STM-1/STM-4/STM-16 (STM: Synchronous Transfer Mode) and OC-3/OC-12/OC-48(OC: Optical Carrier) interfaces; the internal interfaces are usually Universal Test & Operation PHY Interfaces for ATM (UTOPIA), or Gigabits Media Independent Interface (GMII). The interface panel is part of the Local ATM Switching Network Module, which is used for implementing network level interface communications of the local ATM switching network, and the interface between the interface panel and the networking controller is an internal interface of ATM. In a preferred embodiment of the present invention, this internal interface is implemented by a local bus or Microprocessor Interface (MPI), wherein the local bus is the bus via which the CPU (Central Processing Unit) in the ATM Switching Network Module accesses peripherals directly; the local bus makes the communications between the networking controller and the ATM Switching Network Module convenient so that CPU can receive the interruption request of the networking controller, and can access and control the networking controller, which makes it possible for the networking controller to implement its software functions by invoking CPU. The Fiber Ring Network 30 is equal to a backbone, which connects all networking controllers together. Such a backbone, in a preferred embodiment of the present invention, is based on Fiber Media Transmission; and due to its characteristics such as great capacity, high speed and high efficiency, a fiber network is suitable to being used as a backbone.

The networking controller supports the configuration of two modes: the primary mode and the backup mode, where the primary mode is the normal working mode. In the primary mode, a networking controller needs to perform all the functions required by the present invention; in the backup mode, a networking controller only needs to handle ATM services and implement the transparent transmission of control information and alarm information without any processing. The backup mode makes it possible to realize the protection of the interface panel on which networking controllers depend; to have redundant configuration of networking controllers and to enhance the reliability of the system. The connecting method of the networking controllers in the backup mode is the same as that of the networking controllers in the primary mode.

Figure 4:
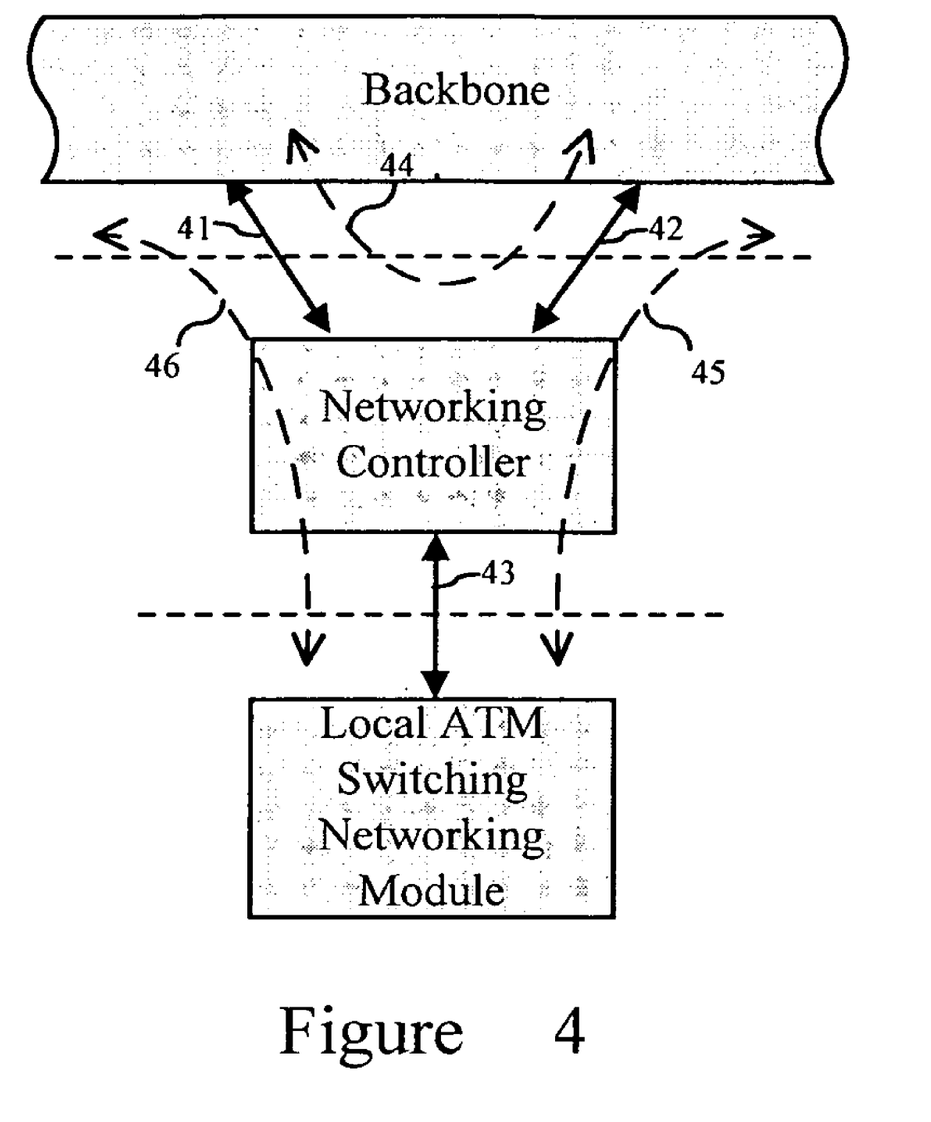
FIG. 4 is a schematic diagram illustrating an interface structure of the networking controller in accordance with an embodiment of the present invention.

FIG. 4 illustrates the interfaces and connections of the networking controller in a preferred embodiment of the present invention. Typically, a networking controller has at lease one external interface and one internal interface. The external interfaces 41 and 42 are connected to the networking controllers of the left and right adjacent nodes on the backbone, and the internal interface 43 is connected to the Local ATM Switching Network Module. The Transparent Transmission Link 44 for network services and the Upstream/Downstream Transmission Links 45 and 46 for local services may be implemented by designing the functions of networking controllers. In the present invention, the network services related to the local switching network are transmitted via Links 45 and 46 while network services irrelevant to local network are transmitted via Link 44. In this way, it is ensured that the service transmission of other nodes on the backbone will not pass the local switching network so that the transmission efficiency is improved and the network resources are economized. The local Uplink/Downlink services and transparently transmitted services are uniformly dispatched and switched in the networking controllers, which do not occupy the resources of switching network of the node where the services are.

It is understood by those skilled in the art that if multiple external interfaces are designed for the networking controllers according to the networking requirements, and are connected with each other according to the network topology of the networking mode, the other networking modes mentioned above can be realized, which does not depart from the essence and scope of the present invention.

Moreover, it is understood as well by those skilled in the art that the aforesaid networking controllers can be used for ATM devices, IP/Ethernet devices, Time Division Multiplex (TDM) devices, SDH devices, Multi-protocol Label Switching (MPLS) devices and so on, which can be implemented by properly modifying the corresponding functional modules without departing the essence and scope of the present invention.

To sum up, the foregoing is only preferred embodiments of the present invention and is not for use in limiting the protection scope thereof.

What is claimed is:

1. An Asynchronous Transfer Mode (ATM) networking controller, comprising:
   an external interface and an internal interface;
   an Interface Processing Module for processing network transmission services, and for implementing Uplink/Downlink transmission of local services and transparent transmission of non-local services;
   an Operation and Maintenance (OAM) Processing Module for implementing an automatic topology management and a data configuration synchronization through OAM information elements;
   a Switching and Scheduling Processing Module for scheduling interconnection services, and guaranteeing the Quality of Service thereof; and
   a Routing or Protection Switching Module for switching paths, implementing self-healing recovery of services, detecting failures in an ATM layer and a transfer layer, and performing the switching protection when a failure is detected,
   wherein the Interface Processing Module, the OAM Processing Module, the Switching and Scheduling Processing Module and the Routing or Protection Switching Module are implemented by at least one Application-Specific Integrated Circuits (ASIC) or Field Programmable Gate Array (FPGA).

2. The ATM networking controller according to claim 1, wherein, the Interface Processing Module, the OAM Processing Module, the Switching and Scheduling Processing Module and the Routing or Protection Switching Module are interconnected.

3. The ATM networking controller according to claim 1, wherein the external interface and the internal interface comprises, respectively, a universal interface conforming to ATM standards.

* * * * *